United States Patent
Chen et al.

(10) Patent No.: US 11,316,421 B2
(45) Date of Patent: *Apr. 26, 2022

(54) APPARATUS, DIMMABLE LIGHT EMITTING DIODE DRIVER AND CONTROL METHOD

(71) Applicant: Silergy Semiconductor Technology (Hangzhou) LTD, Hangzhou (CN)

(72) Inventors: Huiqiang Chen, Hangzhou (CN); Jianxin Wang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/705,962

(22) Filed: Dec. 6, 2019

(65) Prior Publication Data

US 2020/0113026 A1    Apr. 9, 2020

Related U.S. Application Data

(63) Continuation of application No. 16/211,498, filed on Dec. 6, 2018, now Pat. No. 10,536,999.

(30) Foreign Application Priority Data

Dec. 28, 2017   (CN) .......................... 201711460088.5

(51) Int. Cl.
| | |
|---|---|
| *H02M 1/14* | (2006.01) |
| *H02M 7/15* | (2006.01) |
| *H05B 45/10* | (2020.01) |
| *H05B 45/395* | (2020.01) |
| *H05B 45/36* | (2020.01) |
| *H05B 45/3725* | (2020.01) |

(Continued)

(52) U.S. Cl.
CPC ............... *H02M 1/14* (2013.01); *H02M 7/15* (2013.01); *H05B 45/10* (2020.01); *H05B 45/36* (2020.01); *H05B 45/3725* (2020.01); *H05B 45/395* (2020.01); *H05B 45/31* (2020.01); *H05B 45/345* (2020.01); *H05B 45/3575* (2020.01); *Y02B 20/30* (2013.01)

(58) Field of Classification Search
CPC .............. H05B 39/048; H05B 33/0815; H05B 33/0845; H05B 39/04; H05B 39/044; H05B 33/0848; H05B 37/02; H05B 41/3924; H05B 33/0818; H05B 37/0281; H05B 39/083

See application file for complete search history.

(56) References Cited

U.S. PATENT DOCUMENTS

| | | | |
|---|---|---|---|
| 8,614,551 B2 | 12/2013 | Chen et al. | |
| 9,125,270 B2 | 9/2015 | Liao et al. | |

(Continued)

FOREIGN PATENT DOCUMENTS

CN    206042438 U    3/2017

*Primary Examiner* — Monica C King

(57) ABSTRACT

An apparatus can include: a linear drive circuit configured to control a drive current flowing through an LED load; a control circuit configured to acquire a conduction angle signal of a silicon-controlled rectifier dimmer and control the linear drive circuit; and the control circuit being configured to control the drive current to be decreased to reduce a current ripple and to maintain the silicon-controlled rectifier dimmer in a turn-on state when the conduction angle signal is less than a predetermined value.

21 Claims, 15 Drawing Sheets

(51) Int. Cl.
*H05B 45/31* (2020.01)
*H05B 45/345* (2020.01)
*H05B 45/3575* (2020.01)

(56) References Cited

U.S. PATENT DOCUMENTS

| | | |
|---|---|---|
| 9,578,706 B1 | 2/2017 | Lai et al. |
| 2012/0230073 A1* | 9/2012 | Newman, Jr. ...... H05B 33/0815 363/126 |
| 2014/0062322 A1 | 3/2014 | Yu et al. |
| 2016/0143104 A1 | 5/2016 | Chen et al. |
| 2018/0310376 A1 | 10/2018 | Huang et al. |

* cited by examiner

APPARATUS, DIMMABLE LIGHT EMITTING DIODE DRIVER AND CONTROL METHOD

RELATED APPLICATIONS

This application is a continuation of the following application, U.S. patent application Ser. No. 16/211,498, filed on Dec. 6, 2018, and which is hereby incorporated by reference as if it is set forth in full in this specification, and which also claims the benefit of Chinese Patent Application No. 201711460088.5, filed on Dec. 28, 2017, which is incorporated herein by reference in its entirety.

FIELD OF THE INVENTION

The present invention generally relates to the field of power electronics, and more particularly to an LED driver and associated circuits and methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Silicon-controlled rectifier dimming is a commonly used dimming method. A phase control method can be employed by a silicon-controlled rectifier dimmer to perform dimming. That is, the silicon-controlled rectifier dimmer can be controlled to be turned on in each half cycle of the sinusoidal wave in order to acquire the same turn-on phase angle. By adjusting the chopper phase of the silicon-controlled rectifier dimmer, the turn-on phase angle can be changed to perform dimming. In one approach, a silicon-controlled rectifier dimmer may be generally combined with linear constant current control. Linear constant current control may be implemented by controlling a linear device (e.g., a transistor in a linear region) substantially connected in series with at least a portion of a light-emitting diode (LED) load, in order to adjust the current flowing through the LED load so as to maintain the current as constant. A time period during which the silicon-controlled rectifier dimmer is turned on in an operation period (typically a half-wave period of the alternating current) may be indicated by a conduction angle. A relatively small conduction angle may correspond to a relatively large current ripple of the drive current. Further, when the conduction angle is relatively small, a large current ripple can be caused due to jittering of the conduction angle of the silicon-controlled rectifier dimmer, which can result in flickering of the LED load.

Figure 1:
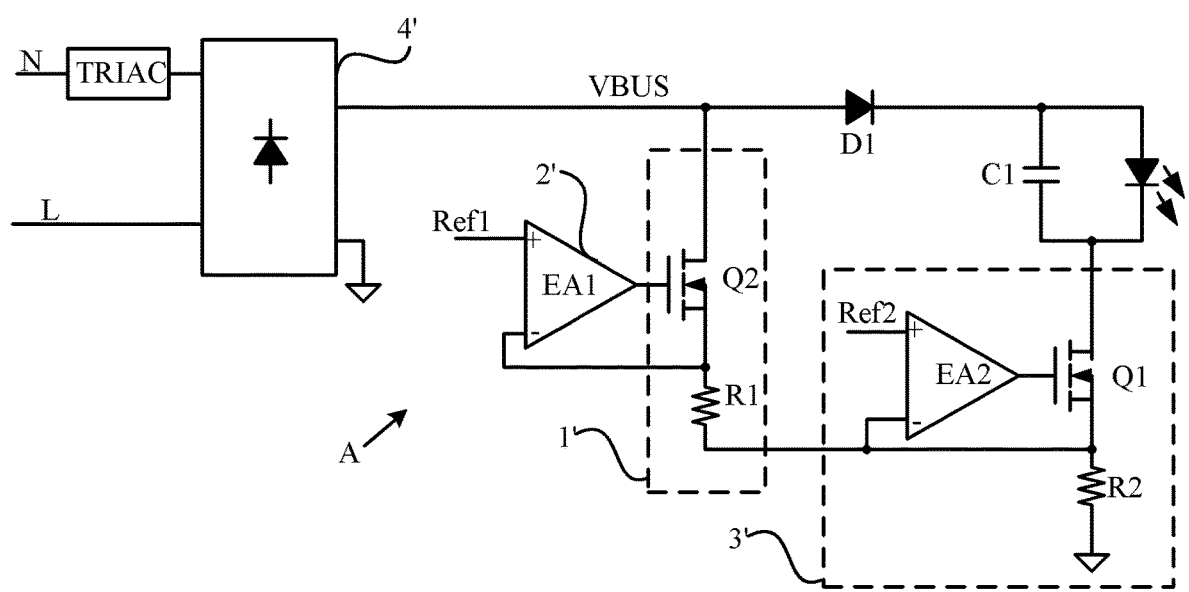
FIG. 1 is a schematic block diagram of an example LED drive circuit.
Figure 2:
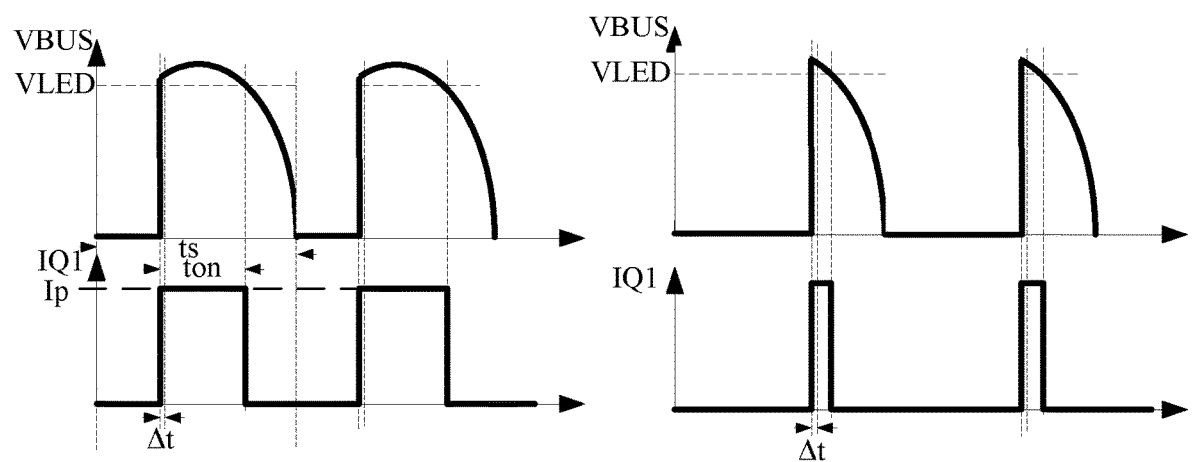
FIG. 2 is a waveform diagram of example operation of the LED drive circuit of FIG. 1.

Referring now to FIG. 1, shown is a schematic block diagram of an example LED drive circuit. Referring also to FIG. 2, shown is a waveform diagram of example operation of the LED drive circuit of FIG. 1. In this example, LED drive circuit A can include silicon-controlled rectifier dimmer TRIAC, bleeder circuit 1', controller 2', constant current control circuit 3', and rectification circuit 4'. LED drive circuit A may also include diode D1 connected to a direct current bus, and filter capacitor C1 connected in parallel with an LED load. Silicon-controlled rectifier dimmer TRIAC can connect between rectification circuit 4' and an alternating current input terminal to chop an alternating current input voltage. Rectification circuit 4' can convert the alternating current input voltage into a direct current bus voltage VBUS at a terminal of the direct current bus. Constant current control circuit 3' may be substantially connected in series with the LED load. Constant current control circuit 3' can control transistor Q1 to operate in a linear region such that a current flowing through the LED load is constant and controllable.

Constant current control circuit 3' may include transistor Q1, resistor R2, and error amplifier EA2 for controlling transistor Q1. Transistor Q1 can connect between the LED load and resistor R2. One terminal of resistor R2 can connect to a source of transistor Q1, and the other terminal of resistor R2 can connect to ground. A gate of transistor Q1 can connect to an output terminal of error amplifier EA2. A non-inverting input terminal of error amplifier EA2 can receive load current reference signal Ref2, and an inverting input terminal of error amplifier EA2 can connect to the source of transistor Q1. Since a voltage at the inverting input terminal of error amplifier EA2 may indicate a current flowing through transistor Q1 due to a voltage drop across resister R2, the output signal of error amplifier EA2 may change with the load current, thus forming a current closed loop. Transistor Q1 controlled by the output signal of error amplifier EA2 can operate in the linear region and adjust the current flowing through transistor Q1 to be consistent with load current reference signal Ref2.

Further, bleeder circuit 1' may be substantially connected in parallel with a circuit formed by the LED load and constant current control circuit 3'. Bleeder circuit 1' can sink a bleeder current from the direct current bus in a time period during which silicon-controlled rectifier dimmer TRIAC is not turned on, and in a time period during which direct current bus voltage VBUS is less than predetermined lighting voltage VLED. In FIG. 1, bleeder circuit 1' can include transistor Q2 and resistor R1. Resistor R1 can connect between a source of transistor Q2 and the end of resistor R2 away from the ground terminal. Transistor Q2 can connect between the direct current bus and resistor R1.

Bleeder circuit 1' may be controlled by controller 2' to sink the bleeder current. In FIG. 1, controller 2' can include error amplifier EA1. A non-inverting input terminal of error amplifier EA1 can receive bleeder current reference signal Ref1, an inverting input terminal of error amplifier EA1 can receive a voltage at a high voltage terminal of resistor R2, and an output terminal of error amplifier EA1 can connect to a gate of transistor Q2. Bleeder current reference signal Ref1 may correspond to a latching current of silicon-controlled rectifier dimmer TRIAC. In the time period during which direct current bus voltage VBUS is less than predetermined lighting voltage VLED, transistor Q1 may be turned off or the LED load may not be turned on, and transistor Q2 can be turned on and operate in the linear region or other states in order to sink the bleeder current.

In order to maintain operation of the silicon-controlled rectifier dimmer, bleeder circuit 1' can sink the bleeder current greater than or equal to latching current IL until direct current bus voltage VBUS is greater than lighting voltage VLED. When direct current bus voltage VBUS rises to a voltage greater than lighting voltage VLED, transistor Q1 can be be turned on and operate in the linear region to adjust the current flowing through the LED load. Further, since the voltage at the inverting input terminal of error amplifier EA1 is greater than bleeder current reference signal Ref1, the output signal of error amplifier EA1 can be negative and transistor Q2 may be turned off. After direct current bus voltage VBUS decreases to a voltage less than lighting voltage VLED, transistor Q1 can again be turned off, and transistor Q2 again turned on to operate.

In this approach, silicon-controlled rectifier dimmer TRIAC may chop a sinusoidal alternating current signal at different angles, and the chopped signal can be rectified and output to the direct current bus to drive the LED load. In FIG. 2, a waveform on the left side shows direct current bus voltage VBUS and drive current IQ1 of transistor Q1 at a relatively large conduction angle, and a waveform on the right side shows direct current bus voltage VBUS and drive current IQ1 of transistor Q1 at a relatively small conduction angle. In FIG. 2, drive current IQ1 can be controlled to be maintained at desired current value Ip. Ripple amplitude ΔI of drive current IQ1 may be expressed by the following formula (1).

$$\Delta I = \frac{((Ip - Ip \times ton/ts) \times ton/C1 - VLED)}{RLED} \bigg/ (Ip \times ton/ts) \quad (1)$$

For example, ΔI represents the ripple amplitude of the drive current, Ip represents a value of the drive current, ts represents an operation period which is a constant value related to a period of an alternating current input voltage, and ton represents a time period during which the LED load is lighted in a half-wave period (e.g., a time period during which transistor Q1 is turned on). For example, C1 represents a capacitance of capacitor C1, and VLED represents a lighting voltage. The LED load can operate when a voltage across the LED load is higher than the lighting voltage, and RLED may represent a resistance of the LED load. The above formula (1) may be simplified as follows below in formula (2).

$$\frac{(Ip \times ts - Ip \times ton) \times ton/C1}{RLED \times Ip \times ton} - \frac{VLED}{RLED \times (Ip \times ton/ts)} = \Delta I \quad (2)$$

During each operation period, a relatively small time period ton may correspond to a relatively large current ripple. Further, when jittering exists in the time period ton for different operation periods, such as when the time period ton changes by an amount of Δt in different operation periods, a relatively small time period ton can correspond to a relatively large current ripple in the case of the same amount of Δt. The time period ton may be directly related to the waveform of the direct current bus voltage, which can be determined by the conduction angle of the silicon-controlled rectifier dimmer. In the example circuit of FIG. 1, the cases at different conduction angles are controlled in a same manner such that a relatively large current ripple may be caused due to jittering of the conduction angle in the case of a relatively small conduction angle, which can result in flickering of the LED load.

In one embodiment, an apparatus can include: (i) a linear drive circuit configured to control a drive current flowing through an LED load; (ii) a control circuit configured to acquire a conduction angle signal of a silicon-controlled rectifier dimmer and control the linear drive circuit; and (iii) the control circuit being configured to control the drive current to be decreased to reduce a current ripple and to maintain the silicon-controlled rectifier dimmer in a turn-on state when the conduction angle signal is less than a predetermined value.

Figure 3:
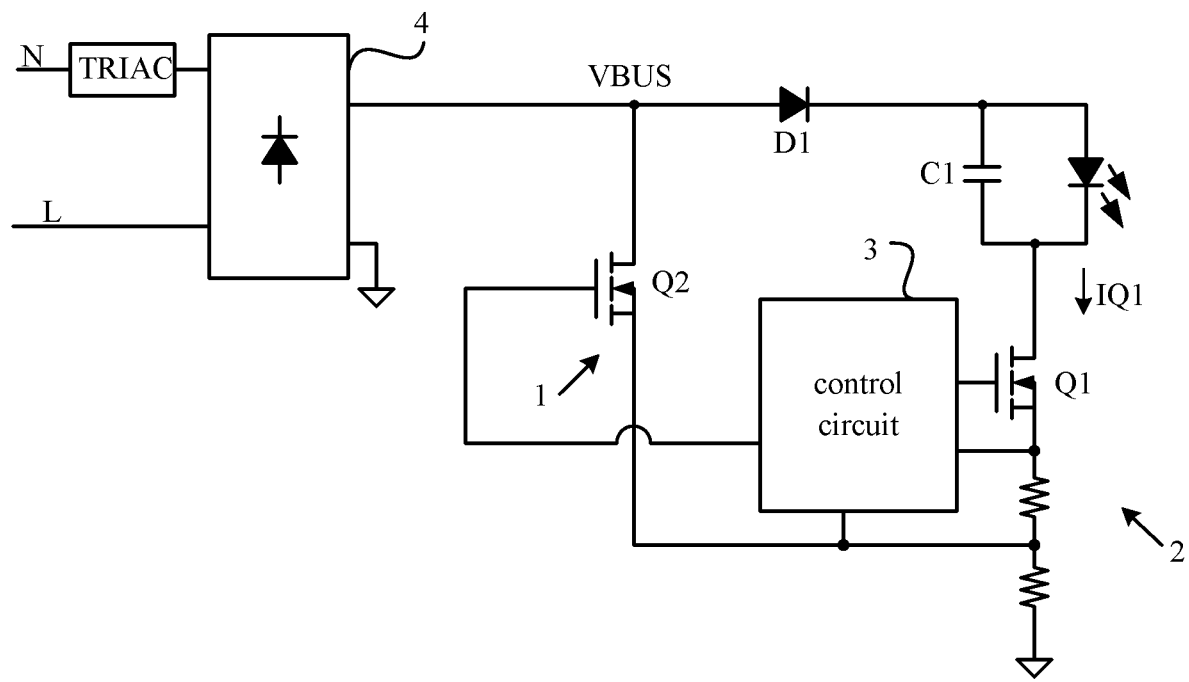
FIG. 3 is a schematic block diagram of a first example LED drive circuit, in accordance with embodiments of the present invention.

Referring now to FIG. 3, shown is a schematic block diagram of a first example LED drive circuit, in accordance with embodiments of the present invention. In this particular example, the LED drive circuit can include silicon-controlled rectifier dimmer TRIAC, bleeder circuit 1, linear drive circuit 2, control circuit 3, and rectification circuit 4. Silicon-controlled rectifier dimmer TRIAC can connect between rectification circuit 4 and an alternating current input terminal to chop an alternating current input voltage. Rectification circuit 4 can convert an alternating current voltage into a direct current voltage to be output to a direct current bus. Bleeder circuit 1 can connect between the direct current bus and a ground terminal to form a current path substantially in parallel with the LED load. Bleeder circuit 1 can sink a bleeder current from the direct current bus, and continuously maintain operation of silicon-controlled rectifier dimmer TRIAC.

Bleeder circuit 1 can include transistor Q2, and linear drive circuit 2 can include transistor Q1. Linear drive circuit 2 can control a drive current flowing through the LED load, and maintain the drive current as substantially constant. The LED drive circuit may also include diode D1 connected between the direct current bus, and an output port of linear drive circuit 2 where filter capacitor C1 connection in parallel with the LED load. In alternative embodiments, diode D1 may be replaced with one or more other unidirectional conductive circuits. Bleeder circuit 1 and linear drive circuit 2 may further be provided with resistors in order to sample the bleeder current.

Control circuit 3 may acquire a conduction angle signal of the silicon-controlled rectifier dimmer and control linear drive circuit 2. The conduction angle is defined as an angle that represents the turn-on moment of the silicon-controlled rectifier dimmer in an operation period. The conduction angle signal may indicate the turn-on moment or the conduction angle. Control circuit 3 can control drive current IQ1 to be decreased to reduce a current ripple and maintain silicon-controlled rectifier dimmer TRIAC in a turn-on state when the conduction angle signal is less than a predetermined value. As long as drive current IQ1 is decreased, the current ripple can be reduced. Drive current IQ1 may still be required to be maintained at a current greater than a holding current of the silicon-controlled rectifier dimmer, in order to ensure that silicon-controlled rectifier dimmer TRIAC is in the turn-on state.

In particular embodiments, drive current IQ1 may be decreased to a current corresponding to the conduction angle signal. The conduction angle signal may be acquired in various ways. For example, the conduction angle signal can be acquired by detecting direct current bus voltage VBUS. For example, the conduction angle signal may be acquired by detecting a time period from a time instant at which direct current bus voltage VBUS rises to a voltage greater than a first threshold, to a time instant at which direct current bus voltage VBUS deceases to a voltage less than a second threshold in an operation period. The first threshold may denote a voltage at a time instant at which silicon-controlled rectifier dimmer TRIAC is turned on, and the second threshold may denote a voltage at a certain time instant after the time instant at which silicon-controlled rectifier dimmer TRIAC is turned on and before a time instant at which silicon-controlled rectifier dimmer TRIAC is turned off. For example, the conduction angle signal may be acquired by detecting the drive current. Specifically, the conduction angle signal may be acquired by detecting a time period during which the drive current is continuously greater than a third threshold.

In addition, the drive current may be decreased based on the conduction angle signal in various ways to obtain a desired current. For example, control circuit 3 can decrease a reference voltage based on the conduction angle signal to control linear drive circuit 2 to generate the desired current. The reference voltage may indicate a desired value of drive current IQ1. In another example, control circuit 3 may adjust a dimming curve circuit based on the conduction angle signal to generate the current. In another example, the control circuit may reduce a compensation signal based on the conduction angle signal in order to generate the current. The compensation signal can be obtained based on a predetermined reference voltage and a current sampling signal of the drive current. In addition, control circuit 3 may control bleeder circuit 1 to operate. In another example, a separate control circuit may be provided to control bleeder circuit 1 to operate.

In particular embodiments, the drive current can be decreased in the case that the conduction angle of the silicon-controlled rectifier dimmer is relatively small, such that a relatively small conduction angle corresponds to a relatively small drive current. In this way, the current ripple can be effectively reduced, the influence of the jittering of the conduction angle can be reduced, and flickering of the LED load can be substantially avoided.

Figure 4:
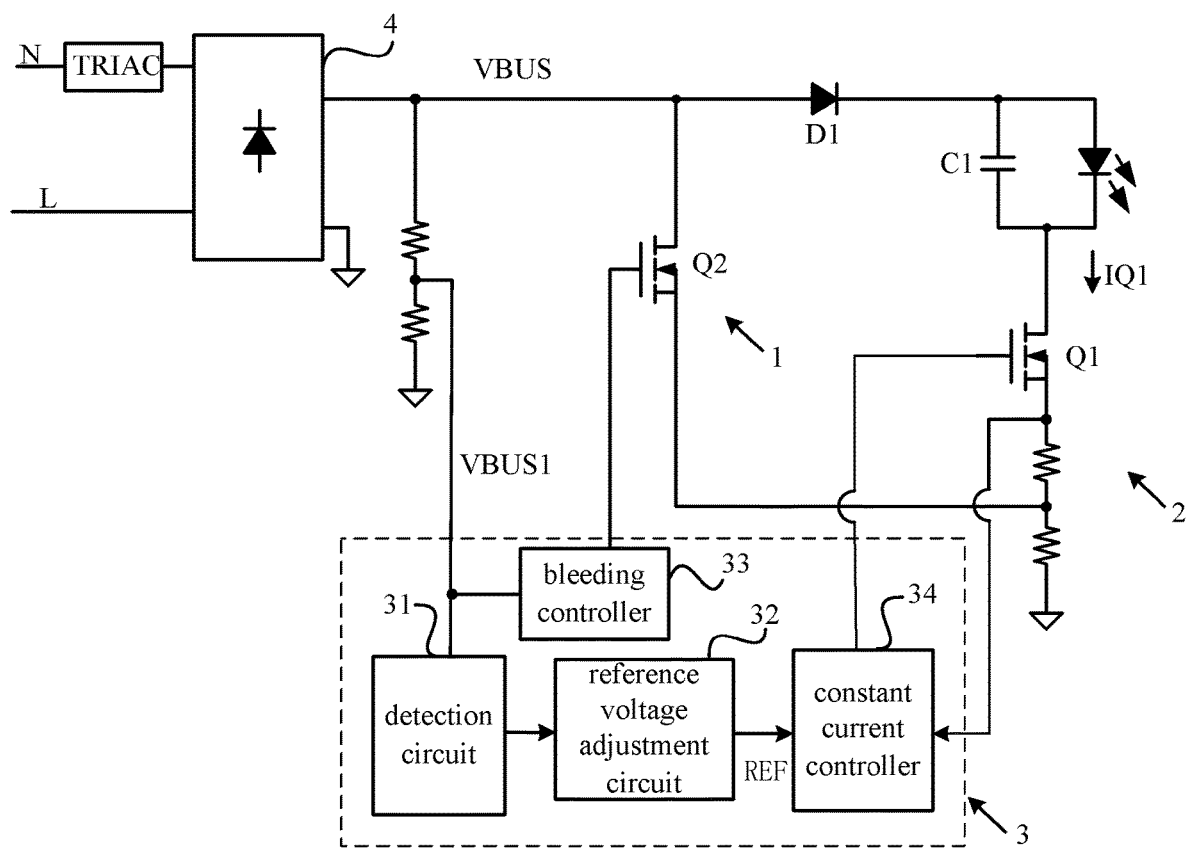
FIG. 4 is a schematic block diagram of a second example LED drive circuit, in accordance with embodiments of the present invention.

Referring now to FIG. 4, shown is a schematic block diagram of a second example LED drive circuit, in accordance with embodiments of the present invention. In this particular example, the LED drive circuit can include silicon-controlled rectifier dimmer TRIAC, bleeder circuit 1, linear drive circuit 2, control circuit 3, and rectification circuit 4. In this particular example, linear drive circuit 2 can include transistor Q1, diode D1, and filter capacitor C1. Filter capacitor C1 can connect in parallel with an LED load. Diode D1 and transistor Q1 may be arranged on a current path of the parallel circuit formed by filter capacitor C1 and the LED load. Diode D1 can prevent capacitor C1 from being discharged to an input port. Transistor Q1 may adjust drive current IQ1 flowing through the LED load. Control circuit 3 can control linear drive circuit 2, mainly to control the operation state of transistor Q1 in order to drive the LED load. In this example, circuit 1 can include transistor Q2, and control circuit 3 can control bleeder circuit 1.

In particular embodiments, control circuit 3 may detect a direct current bus voltage VBUS by using a voltage dividing circuit including resistors R1 and R2, in order to acquire the conduction angle signal. Control circuit 3 can include detection circuit 31, reference voltage adjustment circuit 32, bleeding controller 33, and constant current controller 34. Detection circuit 31 may acquire the conduction angle signal by detecting the direct current bus voltage VBUS. For example, detection circuit 31 may acquire a signal indicating a time period from a time instant at which direct current bus voltage VBUS rises to a voltage greater than a first threshold to a time instant at which direct current bus voltage VBUS decreases to a voltage less than a second threshold, to acquire the conduction angle signal. The first threshold may denote a voltage at a time instant at which silicon-controlled rectifier dimmer TRIAC is turned on, and the second threshold may denote a voltage at a certain time instant after the time instant at which silicon-controlled rectifier dimmer TRIAC is turned on and before a time instant at which silicon-controlled rectifier dimmer TRIAC is turned off. For example, the first threshold may be set to be an integer multiple of the second threshold in order to better reuse a voltage source.

Reference voltage adjustment circuit 32 can decrease reference voltage REF based on the conduction angle signal, in order to achieve a decreased drive current IQ1 when the conduction angle signal is relatively small. Bleeding controller 33 can control bleeder circuit 1. In this example, control circuit 3 may detect direct current bus voltage VBUS, and bleeding controller 33 may control bleeder circuit 1 for bleeding based on an introduced voltage VBUS1 that indicates direct current bus voltage VBUS. In this way, direct current bus voltage VBUS can be controlled to change in a predetermined manner during the bleeding. Constant current controller 34 can control transistor Q1 based on reference voltage REF.

Figure 5:
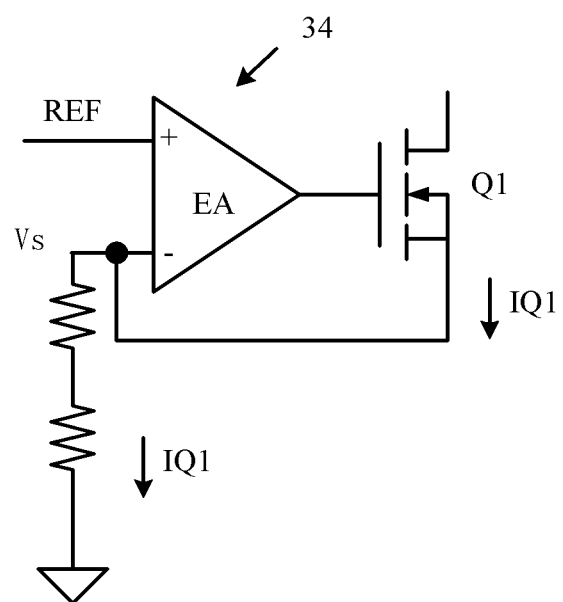
FIG. 5 is a schematic block diagram of an example constant current controller for the second example LED drive circuit, in accordance with embodiments of the present invention.

Referring now to FIG. 5, shown is a schematic block diagram of an example constant current controller for the second example LED drive circuit, in accordance with embodiments of the present invention. In this particular example, constant current controller 34 can include error amplifier EA. One input terminal of error amplifier EA can receive reference voltage REF, the other input terminal of error amplifier EA may receive current sampling signal Vs obtained by sampling with a resistor, and an output terminal of error amplifier EA can connect to a gate terminal of transistor Q1. Constant current controller 34 may form a current feedback loop based on the fed-back current sampling signal Vs, in order to control transistor Q1 to maintain current IQ1 flowing through transistor Q1 as substantially constant at a desired current corresponding to reference voltage REF.

Figure 6:
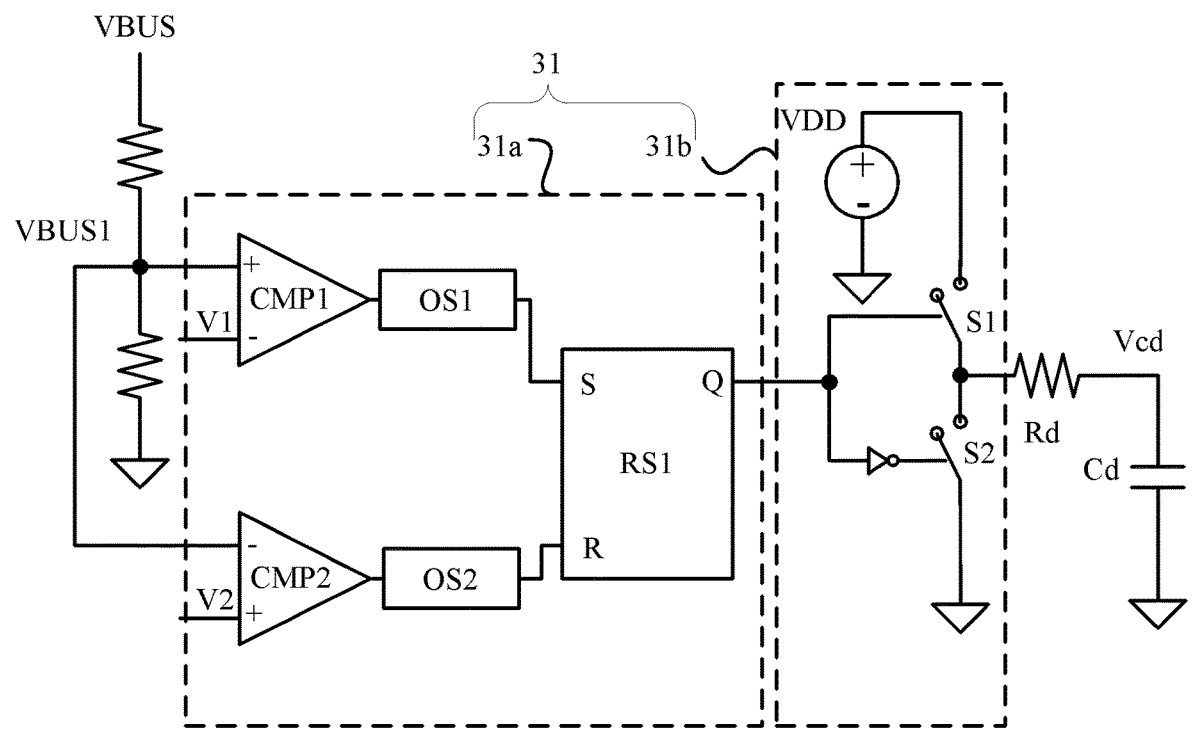
FIG. 6 is a schematic block diagram of an example detection circuit for the second example LED drive circuit, in accordance with embodiments of the present invention.

Referring now to FIG. 6, shown is a schematic block diagram of an example detection circuit for the second example LED drive circuit, in accordance with embodiments of the present invention. In this particular example, detection circuit 31 can include comparators CMP1 and CMP2, one-shot circuits OS1 and OS2, RS flip-flop RS1, voltage source VDD, switches S1 and S2, resistor Rd, and capacitor Cd. Other components in the circuit than capacitor Cd may be implemented by an integrated circuit. One input terminal of comparator CMP1 can receive voltage VBUS1 indicating direct current bus voltage VBUS, the other input terminal of comparator CMP1 can receive threshold V1, and an output terminal of comparator CMP1 can connect to an input terminal of one-shot circuit OS1. An output terminal of one-shot circuit OS1 can connect to a set terminal of RS flip-flop RS1. Thus, one-shot circuit OS1 may generate a pulse having a predetermined time length in response to a rising or falling edge of an input signal to set the output signal of RS flip-flop RS1.

One input terminal of comparator CMP2 can receive voltage VBUS1, the other input terminal of comparator CMP2 can receive threshold V2, and an output terminal of comparator CMP2 can connect to an input terminal of one-shot circuit OS2. An output terminal of one-shot circuit OS2 can connect to a reset terminal of RS flip-flop RS1. Thus, one-shot circuit OS2 may generate a pulse having a predetermined time length in response to a rising or falling edge of an input signal to reset the output signal of RS flip-flop RS1. In this way, state controller 31a may be formed. State controller 31a can control a charge and discharge circuit to switch to a first state when it is detected that direct current bus voltage VBUS rises to a voltage greater than a first threshold, and can control the charge and discharge circuit to switch to a second state when it is detected that direct current bus voltage VBUS decreases to a voltage less than a second threshold. The first threshold may correspond to threshold V1, and the second threshold may correspond to threshold V2. Switches S1 and S2 can connect in series between an positive terminal of voltage source VDD and a ground terminal. Switch S1 can be controlled by output signal Q of the RS flip-flop, and switch S2 may be controlled by an inverting signal of output signal Q.

Therefore, switches S1 and S2 are generally in opposite states. Resistor Rd and capacitor Cd can connect in series between a common connection terminal of switch S1 and switch S2 and the ground terminal. When switch S1 is turned on, switch S2 may be turned off, and capacitor Cd can be charged. When switch S1 is turned off, switch S2 may be turned on, and capacitor Cd can be discharged via resistor Rd and switch S2. In this way, charge and discharge circuit 31b may be formed. Charge and discharge circuit 31b can charge capacitor Cd in the first state, and discharge capacitor Cd in the second state under control of the state controller. Resistor Rd and capacitor Cd may form an RC circuit, which can lead to hysteresis on the change of voltage Vcd across capacitor Cd due to the existence of resistor Rd. In this case, voltage Vcd may slowly change with the conduction angle. Since voltage Vcd may change little in an operation period, voltage Vcd at any one time instant in the operation period may serve as the conduction angle signal. Since the capacitor is conductive with respect to an instantaneous voltage (the capacitor has almost no resistance), an instantaneous current can be quite large when the capacitor is directly connected to a power supply, which may result in a charging-end component easily burning. Therefore, the resistor can be connected in series with the capacitor in order to limit a maximum current.

Figure 7:
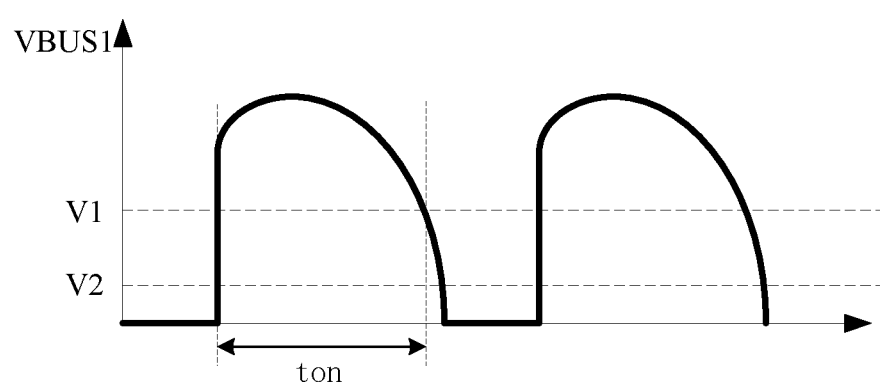
FIG. 7 is a waveform diagram of example operation of the detection circuit of FIG. 6, in accordance with embodiments of the present invention.

Referring now to FIG. 7, shown is a waveform diagram of example operation of the detection circuit of FIG. 6, in accordance with embodiments of the present invention. As shown in FIG. 7, when the silicon-controlled rectifier dimmer is turned on, voltage VBUS1 rises to a voltage greater than threshold V1 with the direct current bus voltage. When the operation period substantially ends, voltage VBUS1 decreases to a voltage less than threshold V2 with the direct current bus voltage. Thus, voltage Vcd may change slowly in one operation period, and may indicate the time period ton from a time instant at which the silicon-controlled rectifier dimmer is turned on to a time instant when the operation period substantially ends. It should be understood that in detection circuit 31, the connection manner of the input terminal of the comparator, the trigger manner of the one-shot circuit, and the connection relation of the RS flip-flop may be adjusted based on the set of a valid level and the relation manner of the input signal.

Figure 8:
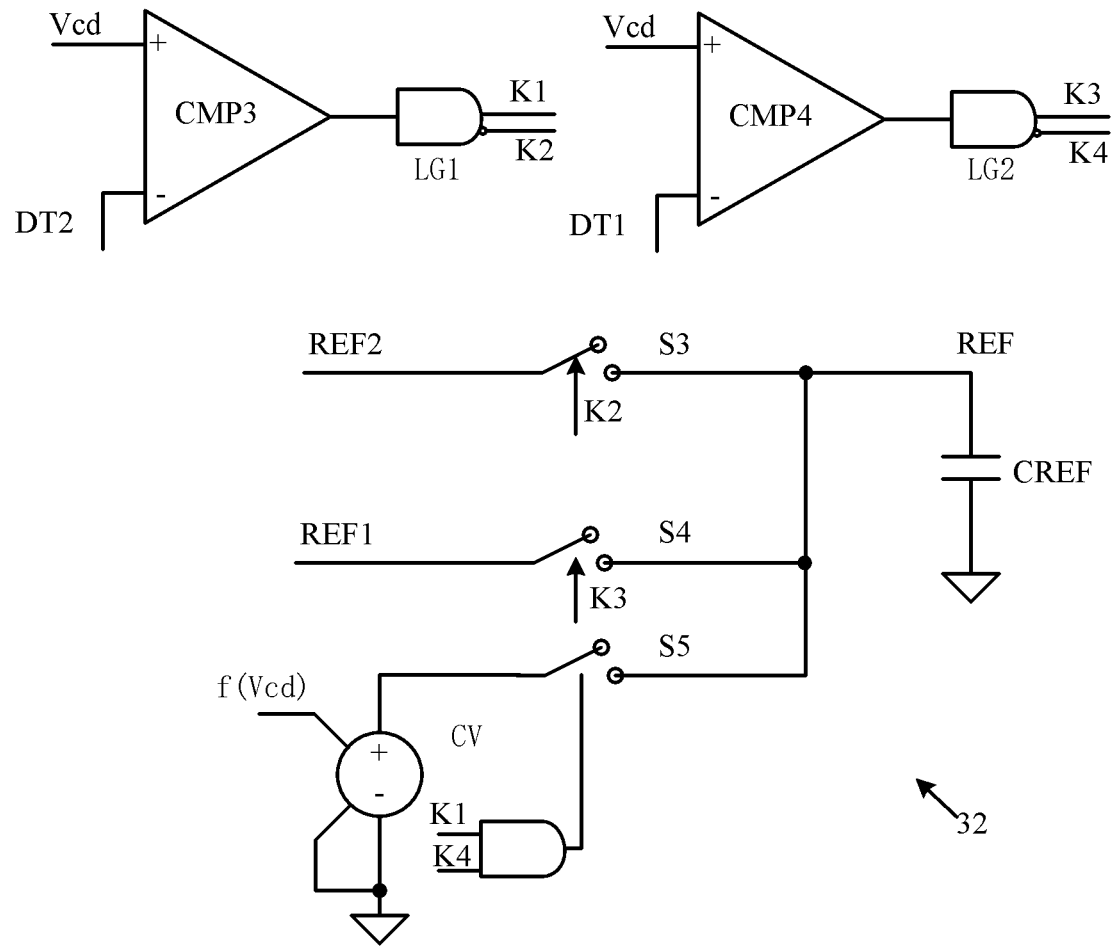
FIG. 8 is a schematic block diagram of an example reference voltage adjustment circuit for the second example LED drive circuit, in accordance with embodiments of the present invention.

Referring now to FIG. 8, shown is a schematic block diagram of an example reference voltage adjustment circuit for the second example LED drive circuit, in accordance with embodiments of the present invention. Reference voltage REF of linear drive circuit 2 may be adjusted and controlled based on the conduction angle signal. As shown, reference voltage adjustment circuit 32 may include comparators CMP3 and CMP4, logic circuits LG1 and LG2, switches S3-S5, controlled voltage source CV, and capacitor CREF. One input terminal of comparator CMP3 can receive conduction angle signal Vcd, the other input terminal of comparator CMP3 may receive threshold DT2, and an output terminal of comparator CMP3 can connect to logic circuit LG1. Logic circuit LG1 may output non-inverting signal K1 and inverting signal K2 of an output signal of comparator CMP3. One input terminal of comparator CMP4 can receive conduction angle signal Vcd, the other input terminal of comparator CMP4 can receive threshold DT1, and an output terminal of comparator CMP4 can connect to logic circuit LG2.

Threshold DT1 may correspond to a first angle threshold, and threshold DT2 may correspond to a second angle threshold less than the first angle threshold. Logic circuit LG2 can output non-inverting signal K3 and an inverting signal K4 of an output signal of comparator CMP4. Switch S3 can be controlled by signal K2, switch S4 can be controlled by signal K3, and switch S5 can be controlled by a signal obtained by performing a logic AND operation on signals K1 and K4. Switch S3 may be used to provide predetermined reference voltage REF2 to the capacitor CREF. Switch S4 may be used to provide predetermined reference voltage REF1 to capacitor CREF. Switch S5 may be used to provide an output signal of controlled voltage source CV to capacitor CREF. The output signal of controlled voltage source CV can change along with conduction angle signal Vcd. A voltage across capacitor CREF as reference voltage REF may be provided to constant current controller 34.

Thus, when conduction angle signal Vcd is greater than threshold DT1, switches S3 and S5 can be turned off, switch S4 can be turned on, and reference voltage REF may be switched to reference voltage REF1, which is higher than reference voltage REF2. When conduction angle signal Vcd is less than threshold DT2, switches S4 and S5 can be turned off, switch S3 may be turned on, and reference voltage REF can be switched to reference voltage REF2. With a lower reference voltage, constant current controller 34 can control transistor Q1 to generate lower drive current IQ1, thereby reducing the current ripple. When conduction angle signal Vcd is not greater than threshold DT1 and not less than threshold DT2, reference voltage REF can change along with conduction angle signal Vcd.

Figure 9:
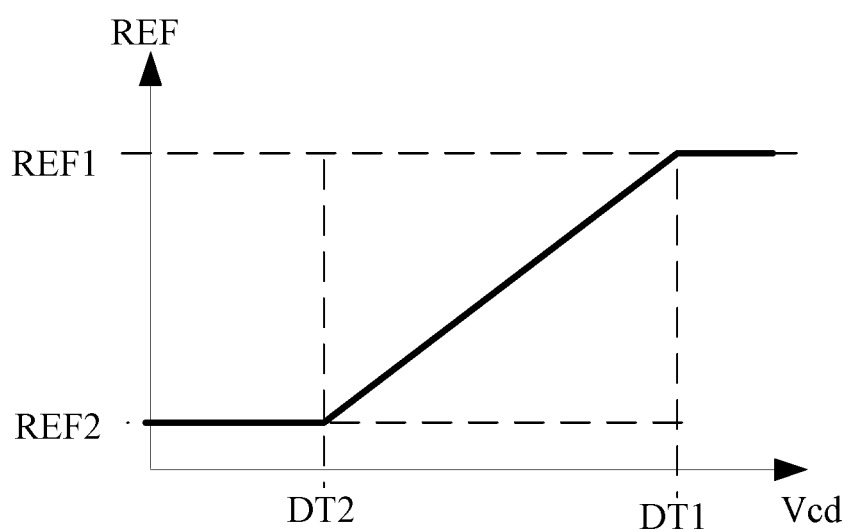
FIG. 9 is a waveform diagram of example operation of the reference voltage adjustment circuit of FIG. 8, in accordance with embodiments of the present invention.

Referring now to FIG. 9, shown is a waveform diagram of example operation of the reference voltage adjustment circuit of FIG. 8, in accordance with embodiments of the present invention. In this example operation waveform, reference voltage REF can change with conduction angle signal Vcd in a linear manner. Reference voltage adjustment circuit 32 may define a reference voltage curve. Reference voltage adjustment circuit 32 may adjust the reference voltage based on the defined reference voltage curve and the conduction angle signal Vcd. In this example reference voltage adjustment circuit 32, capacitor CREF can cause reference voltage REF to change smoothly when being switched.

It should be understood that the function of the reference voltage adjustment circuit in this example may be achieved by other circuit structures, such as controlling the linear drive circuit based on predetermined reference voltage REF1 when the conduction angle signal is greater than angle threshold DT1, controlling the linear drive circuit based on predetermined reference voltage REF2 when the conduction angle signal is less than angle threshold DT2, and controlling the linear drive circuit based on a reference voltage changing with the conduction angle signal when the conduction angle signal is not greater than the first angle threshold and not less than the second angle threshold. It should further be understood that the reference voltage may be adjusted in other manners than that described in particular embodiments, as long as the reference voltage can be decreased when the conduction angle signal is relatively small.

In this example, the conduction angle signal may be acquired by detecting the direct current bus voltage, and the reference voltage indicating a desired value of the drive current can be adjusted based on the conduction angle signal, such that the reference voltage is low when the conduction angle signal is less than the predetermined value, and the reference voltage returns to a normal voltage when the conduction angle signal is large. The linear drive circuit can be controlled based on the reference voltage that changes, to decrease the drive current flowing through the LED load in the case that the conduction angle signal is small, in order to effectively reduce the current ripple.

Figure 10:
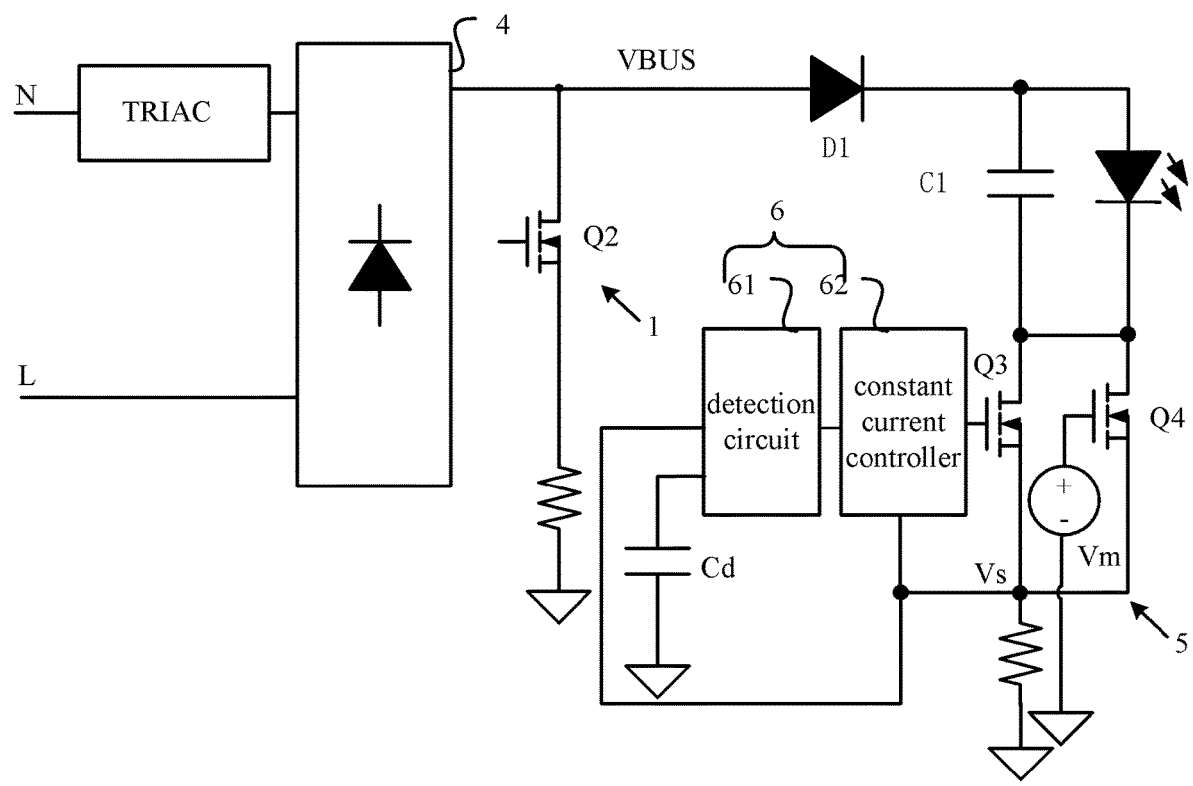
FIG. 10 is a schematic block diagram of a third example LED drive circuit, in accordance with embodiments of the present invention.

Referring now to FIG. 10, shown is a schematic block diagram of a third example LED drive circuit, in accordance with embodiments of the present invention. In this particular example, the LED drive circuit can include silicon-controlled rectifier dimmer TRIAC, bleeder circuit 1, linear drive circuit 5, control circuit 6, and rectification circuit 4. In this example, linear drive circuit 5 can include transistors Q3 and Q4 connected in parallel with each other, diode D1, and filter capacitor C1. Filter capacitor C1 can connect in parallel with an LED load. Diode D1 can be arranged on a current path of the parallel circuit formed by filter capacitor C1 and the LED load. Transistors Q3 and Q4 can be arranged between the LED load and a ground terminal.

Resistor R3 for performing current sampling can connect between a branch formed by transistors Q3 and Q4 connected in parallel with each other and the ground terminal. Transistor Q4 may be controlled by voltage Vm output from a constant voltage source. Thus, the lowest load current flowing through the LED load may be clamped by transistor Q4 when the LED load is in the turn-on state. Further, control circuit 6 can control transistor Q3 based on the conduction angle signal to adjust the load current. In this example, control circuit 6 may acquire the conduction angle signal by detecting the drive current, and can decrease the load current by reducing compensation signal Vcomp. Control circuit 6 may include detection circuit 61 and constant current controller 62. Detection circuit 61 can acquire a signal indicating a time period during which the drive current is continuously greater than a third threshold to acquire conduction angle signal Vcd. Constant current controller 62 may generate compensation signal Vcomp in accordance with conduction angle signal Vcd, reference voltage REF, and current sampling signal Vs to control transistor Q3.

Figure 11:
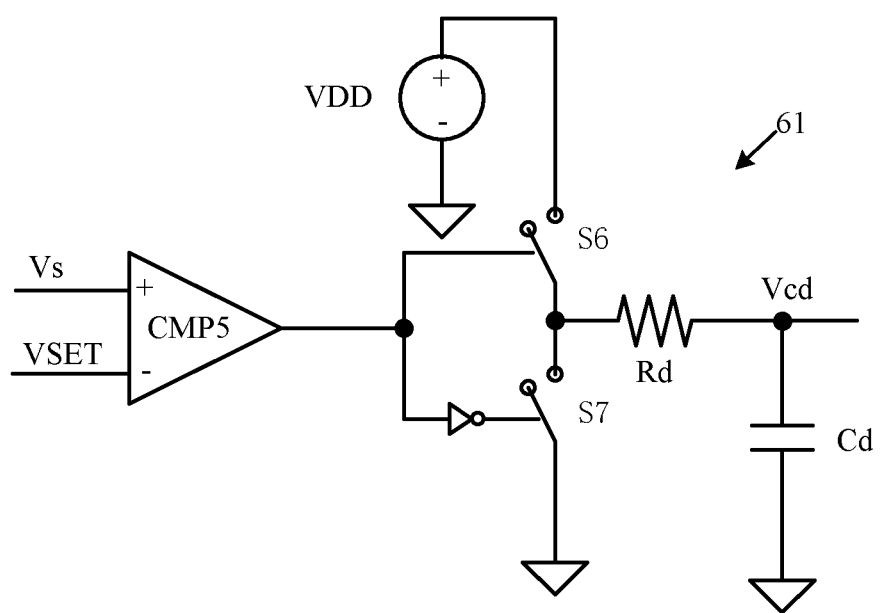
FIG. 11 is a schematic block diagram of an example detection circuit for the third example LED drive circuit, in accordance with embodiments of the present invention.

Referring now to FIG. 11, shown is a schematic block diagram of an example detection circuit for the third example LED drive circuit, in accordance with embodiments of the present invention. In this particular example, detection circuit 61 can include comparator CMP5, a voltage source VDD, switches S6 and S7, resistor Rd, and capacitor Cd. One input terminal of comparator CMP5 may receive current sampling signal Vs representing the drive current flowing transistor Q3, and the other input terminal of comparator CMP5 may receive threshold VSET. Threshold VSET may correspond to the third threshold. Switches S6 and S7 can connect in series between a positive terminal of voltage source VDD and a ground terminal. Switch S6 can be controlled by an output signal of comparator CMP5, and switch S7 may be controlled by an inverting signal of the output signal. Switches S6 and S7 are generally in opposite states. Resistor Rd and capacitor Cd can connect in series between a common connection terminal of switches S6 and S7 and the ground terminal.

When the drive current is greater than the third threshold, current sampling signal Vs may be greater than threshold VSET, comparator CMP5 can output a high level, switch S6 may be turned on, switch S7 may be turned off, and voltage source VDD can charge capacitor Cd via switch S6 and resistor Rd. when the drive current is less than the third threshold (e.g., the drive current is relatively close to zero), current sampling signal Vs can be less than threshold VSET, comparator CMP5 may output a low level, switch S6 may be turned off, switch S7 can be turned on, and capacitor Cd may be discharged via resistor Rd and switch S7.

Figure 12:
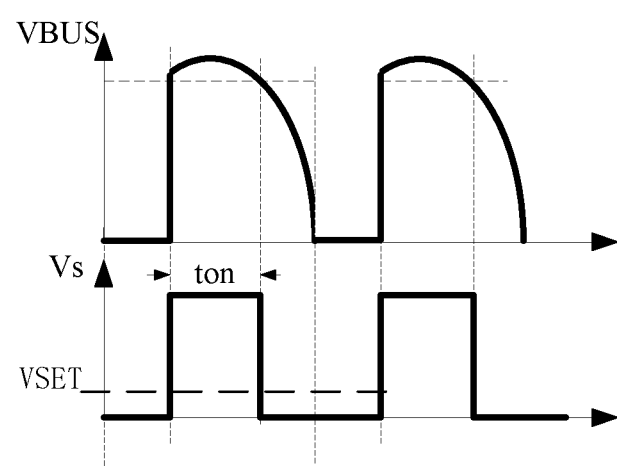
FIG. 12 is a waveform diagram of example operation of the third example LED drive circuit, in accordance with embodiments of the present invention.

Referring now to FIG. 12, shown is a waveform diagram of example operation of the third example LED drive circuit, in accordance with embodiments of the present invention. Due to resistor Rd, voltage Vcd across capacitor Cd may change relatively slowly in an operation period, and may be used to indicate the time period ton during which the LED load operates, which can correspond directly to the conduction angle. Therefore, voltage Vcd may serve as the conduction angle signal.

Figure 13:
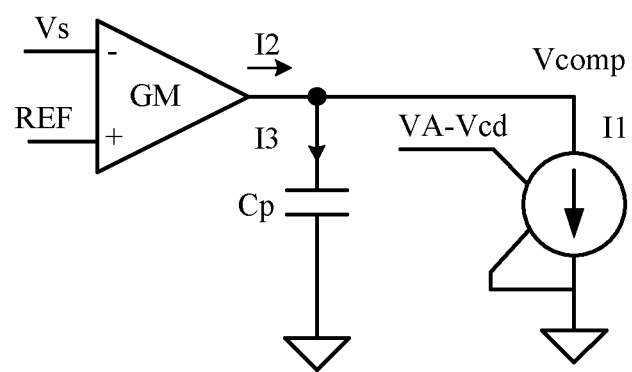
FIG. 13 is a schematic block diagram of an example constant current controller for the third example LED drive circuit, in accordance with embodiments of the present invention.

Referring now to FIG. 13, shown is a schematic block diagram of an example constant current controller for the third example LED drive circuit, in accordance with embodiments of the present invention. In this particular example, the constant current controller can include error amplifier GM, a compensation circuit, and controlled current source I1. One input terminal of error amplifier GM may receive current sampling signal Vs, and the other input terminal of error amplifier GM may receive reference voltage REF. The compensation circuit can connect to an output terminal of error amplifier GM to compensate an error signal output from error amplifier GM, in order to generate compensation signal Vcomp. The compensation circuit may include compensation capacitor Cp. Controlled current source I1 may output a current changing with conduction angle signal Vcd. A current of compensation capacitor Cp may be shunted or increased by the current output from controlled current source I1. In the example circuit shown in FIG. 13, output current I2 of the error amplifier may be expressed as I2=(REF−Vs)*GM, where GM represents an amplification coefficient. Current I3 flowing to compensation capacitor Cp can be expressed by the following formula (3).

$$I3=I2-I1=(REF-Vs)*GM-k(VA-Vcd) \quad (3)$$

For example, k may represent a conversion coefficient of controlled current source I1, and VA can be a predetermined value. It can be seen that when the conduction angle is relatively small, the current of controlled current source I1 is relatively large, and current I3 flowing to compensation capacitor Cp is relatively small. In this way, compensation signal Vcomp can be reduced, and the drive current can be decreased. When the conduction angle is relatively large, the current of transistor Q3 can meet the desired current. When the conduction angle signal is less than the predetermined value (e.g., a third angle threshold), control circuit 6 can decrease the current flowing through transistor Q3, and even decrease the current of transistor Q3 to zero. In this case, the load current may be clamped to a clamp current in transistor Q4, in order to ensure the normal operation of the circuit.

Figure 14:
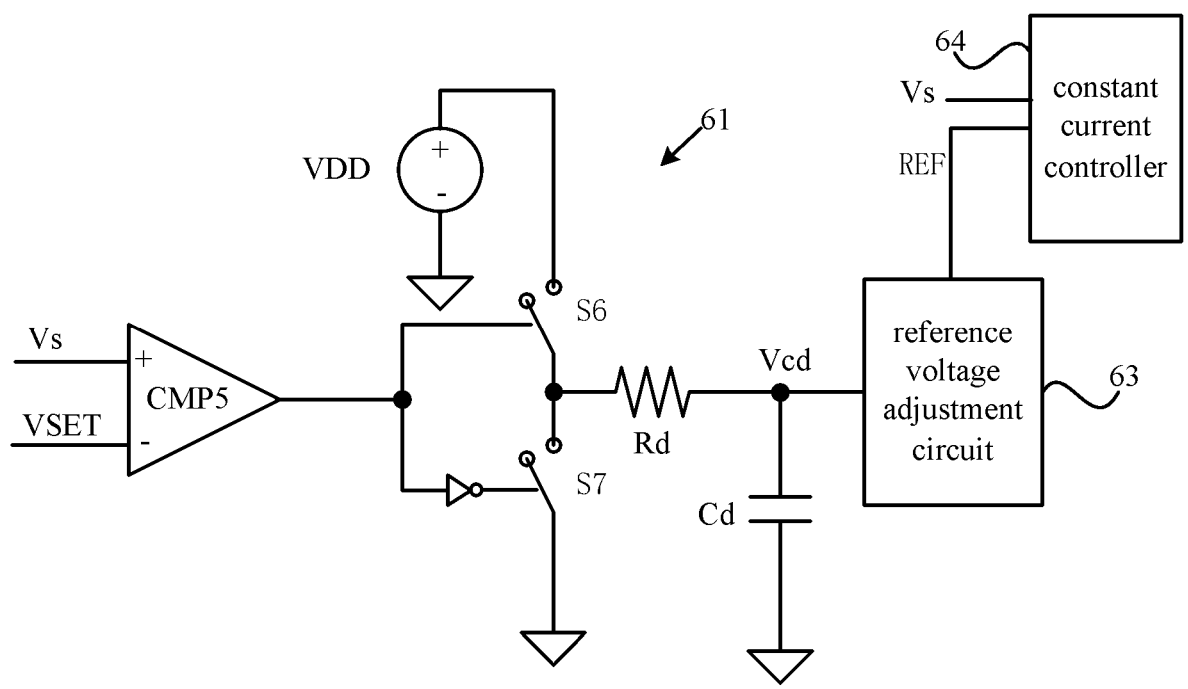
FIG. 14 is a schematic block diagram of an example modified control circuit for the third example LED drive circuit, in accordance with embodiments of the present invention.

Referring now to FIG. 14, shown is a schematic block diagram of an example modified control circuit for the third example LED drive circuit, in accordance with embodiments of the present invention. In this particular example, control circuit 6 can include detection circuit 61, reference voltage adjustment circuit 63, and constant current controller 64. Detection circuit 61 can generate conduction angle signal Vcd by detecting the drive current. Reference voltage adjustment circuit 63 may adjust reference voltage REF based on conduction angle signal Vcd. Constant current controller 64 can control transistor Q3 based on reference voltage REF and current sampling signal Vs. For example, reference voltage adjustment circuit 63 may be implemented by the circuit shown in FIG. 8, and constant current controller 64 may be implemented by the circuit shown in FIG. 5. It should be understood that detection circuit 61 may also be configured to acquire the conduction angle signal by detecting the direct current bus voltage. In this example, the conduction angle signal can be acquired by detecting the drive current, and the reference voltage or the compensation signal indicating a desired value of the drive current may be adjusted based on the conduction angle signal, such that the drive current is small in the case that the conduction angle signal is less than the predetermined value, in order to effectively reduce the current ripple.

Figure 15:
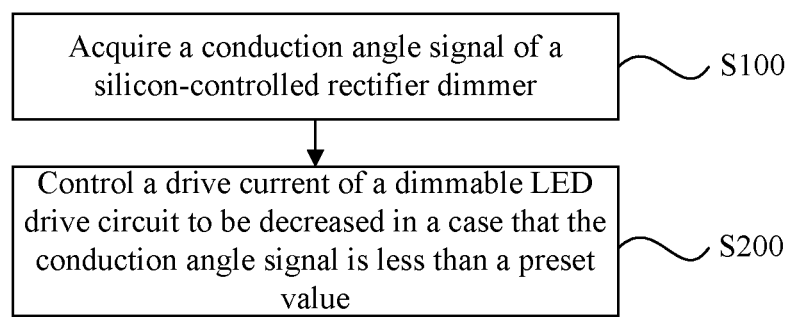
FIG. 15 is a flow diagram of an example control method of an LED drive circuit, in accordance with embodiments of the present invention.

Referring now to FIG. 15, shown is a flow diagram of an example control method of an LED drive circuit, in accordance with embodiments of the present invention. This example control method can be adopted to control a dimmable LED drive circuit with a silicon-controlled rectifier dimmer. At S100, a conduction angle signal of the silicon-controlled rectifier dimmer may be acquired. At S200, when the conduction angle signal is less than a predetermined value, a drive current of the dimmable LED drive circuit can be controlled to be decreased to reduce a current ripple, and the silicon-controlled rectifier dimmer may be maintained in a turn-on state.

At S200, the drive current of the dimmable LED drive circuit can be controlled to be decreased to a current corresponding to the conduction angle signal. For example, S100 can include detecting a direct current bus voltage to acquire the conduction angle signal of the silicon-controlled rectifier dimmer, or detecting the drive current to acquire the conduction angle signal. Further, the detecting a direct current bus voltage to acquire the conduction angle signal of the silicon-controlled rectifier dimmer can include acquiring a signal indicating a time period from a time instant at which the direct current bus voltage rises to a voltage greater than a first threshold to a time instant at which the direct current bus voltage decreases to a voltage less than a second threshold to acquire the conduction angle signal. Further, the detecting the drive current to acquire the conduction angle signal can include acquiring a signal indicating a time period during which the drive current is continuously greater than a third threshold to acquire the conduction angle signal.

For example, S200 can include decreasing a reference voltage based on the conduction angle signal to obtain the current, where the reference voltage indicates a desired value of the drive current, or decreasing a compensation signal based on the conduction angle signal to obtain the current, where the compensation signal is obtained based on a predetermined reference voltage and a current sampling signal of the drive current. The reference voltage may be adjusted based on the conduction angle signal and a predetermined reference voltage curve.

For example, S200 can include controlling the drive current based on a first predetermined reference voltage when the conduction angle signal is greater than a first angle threshold, and controlling the drive current based on a second predetermined reference voltage when the conduction angle signal is less than a second angle threshold; and controlling the drive current based on a reference voltage changing with the conduction angle signal when the conduction angle signal is not greater than the first angle threshold and not less than the second angle threshold. For example, S200 can include controlling the drive current to change with the conduction angle signal when the conduction angle signal is greater than a third angle threshold, and controlling the drive current to be not less than a clamp current when the conduction angle signal is not greater than the third angle threshold.

In particular embodiments, the drive current can be controlled to be decreased to a current corresponding to the conduction angle signal when the conduction angle signal of the silicon-controlled rectifier dimmer is less than the predetermined value, such that a small conduction angle corresponds to a small drive current, thereby effectively reducing the current ripple caused due to the jittering of the conduction angle, and substantially avoiding flickering of the LED load.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An apparatus, comprising:
   a) a current drive circuit configured to provide a driving current to drive a light-emitting diode (LED) load, wherein the current drive circuit comprises a first transistor connected in series with the LED load;
   b) a control circuit comprising a reference voltage, and being configured to control the first transistor in the driving circuit to generate the driving current in accordance with a conduction angle of a silicon-controlled rectifier dimmer; and
   c) the control circuit being configured to control the reference voltage to be decreased gradually with a decrease of the conduction angle, in order to decrease the driving current to avoid flicker of the LED load.

2. The apparatus of claim 1, wherein the reference voltage is controlled to be decreased in a linear manner in accordance with the conduction angle when the conduction angle is less than a predetermined value.

3. The apparatus of claim 2, wherein the control circuit comprises a regulation circuit configured to generate a regulation signal, and the regulation signal is enabled when the conduction angle is less than the predetermined value.

4. The apparatus of claim 1, wherein the control circuit is configured to adjust the reference voltage in accordance with the conduction angle and a predetermined reference voltage curve.

5. The apparatus of claim 1, wherein the control circuit is configured to acquire a conduction angle signal representing the conduction angle in accordance with a detection signal representing a direct current bus voltage.

6. The apparatus of claim 5, wherein the detection circuit is configured to detect a time period during which the direct current bus voltage is greater than a first threshold and less than a second threshold to acquire the conduction angle signal.

7. The apparatus of claim 1, wherein the control circuit is configured to detect the drive current to acquire a conduction angle signal representing the conduction angle.

8. The apparatus of claim 7, wherein the detection circuit is configured to acquire a signal indicating a time period during which the drive current is continuously greater than a third threshold to acquire the conduction angle signal.

9. The apparatus of claim 1, wherein the first transistor is controlled by an error amplifier in the control circuit.

10. The apparatus of claim 1, wherein the current drive circuit comprises a second transistor coupled between the LED load and a ground terminal, wherein the second transistor is configured to clamp a current flowing through the second transistor.

11. The apparatus of claim 1, wherein the control circuit is configured to control the current drive circuit in accordance with the reference voltage having a first predetermined reference voltage with a constant value when the conduction angle is greater than a first angle threshold.

12. The apparatus of claim 1, wherein the control circuit is configured to control the drive circuit to be not less than a clamp current.

13. A dimmable light-emitting diode (LED) drive circuit, comprising:
   a) a rectification circuit coupled to the silicon-controlled rectifier dimmer, wherein the rectification circuit is configured to generate a direct current bus voltage; and
   b) a bleeder circuit coupled to the rectification circuit, and being configured to sink a bleeder current;
   c) a current drive circuit configured to provide a driving current to drive an LED load;
   d) first and second sensing circuits coupled in series with the LED load, wherein the bleeder circuit is coupled to a common node between the first and second sensing circuits; and
   e) a control circuit comprising a reference voltage, and being configured to control the driving circuit in accordance with a conduction angle of a silicon-controlled rectifier dimmer.

14. The drive circuit of claim 13, wherein:
   a) the first and second sensing circuits are configured as first and second sensing resistors coupled in series; and
   b) the bleeder circuit comprises a bleeding transistor having a first power terminal coupled to a direct current bus of the rectification circuit, and a second power terminal coupled to a common node between the first and second sensing resistors.

15. The drive circuit of claim 13, wherein the control circuit is configured to control at least one of the current drive circuit and the bleeder circuit in order to maintain the silicon-controlled rectifier dimmer in a conduction state.

16. The drive circuit of claim 13, wherein the control circuit is configured to decrease the reference voltage to decrease the driving current to avoid the flicker of the LED load.

17. The drive circuit of claim 13, wherein:
   a) the control circuit comprises a regulation circuit to generate a regulation signal; and
   b) the reference voltage is controlled to be decreased when the regulation signal is enabled.

18. The drive circuit of claim 17, wherein the regulation signal is enabled when the conduction angle is less than a predetermined value.

19. The drive circuit of claim 13, wherein no bleeder current is generated by the bleeder circuit when the drive current is greater than a holding current of the dimmer.

20. The drive circuit of claim 13, further comprising an output capacitor coupled in parallel with the LED load.

21. The drive circuit of claim 13, further comprising a unidirectional conductive circuit coupled between a direct current bus and the LED load.

* * * * *